US012809615B2

(12) United States Patent
Vajravel et al.

(10) Patent No.: US 12,809,615 B2
(45) Date of Patent: Nov. 24, 2026

(54) UPDATING FIRMWARE OF PERIPHERAL DEVICES WITH AN INFORMATION HANDLING SYSTEM

(71) Applicant: Dell Products L.P., Round Rock, TX (US)

(72) Inventors: Gokul Thiruchengode Vajravel, Bangalore (IN); Srinivasa Ragavan Rajagopalan, Bangalore (IN); Nalapareddy Reddy Dheeraj Reddy, Nandyal (IN)

(73) Assignee: Dell Products L.P., Round Rock, TX (US)

( * ) Notice: Subject to any disclaimer, the term of this patent is extended or adjusted under 35 U.S.C. 154(b) by 309 days.

(21) Appl. No.: 18/655,398

(22) Filed: May 24, 2024

(65) Prior Publication Data

US 2025/0362897 A1 Nov. 27, 2025

(51) Int. Cl.
*G06F 8/65* (2018.01)

(52) U.S. Cl.
CPC .................................... *G06F 8/65* (2013.01)

(58) Field of Classification Search
CPC .................................................... G06F 8/65
USPC ............................................ 717/168–174
See application file for complete search history.

(56) References Cited

U.S. PATENT DOCUMENTS 7,881,745 B1 * 2/2011 Rao ...................... H04W 24/02 709/203
8,677,348 B1 * 3/2014 Ramanathpura .......... G06F 8/65 717/175
8,924,952 B1 * 12/2014 Hou ......................... G06F 8/65 717/172
9,069,641 B2 * 6/2015 Parry ........................ G06F 8/65
9,116,774 B2 * 8/2015 Rajagopalan ........... G06F 8/654
9,122,558 B2 * 9/2015 Ewington ............... G06F 8/658
(Continued)

FOREIGN PATENT DOCUMENTS

WO WO-2023044255 A1 * 3/2023 ........... G06F 21/602

OTHER PUBLICATIONS

Hall et al, "A Cooperative Approach to Support Software Deployment Using the Software Dock", ACM, pp. 1-10 (Year: 1999).*
(Continued)

*Primary Examiner* — Anil Khatri
(74) *Attorney, Agent, or Firm* — McDermott Will & Schulte LLP

(57) ABSTRACT

Updating firmware at a peripheral device, including identifying a firmware update package for a first peripheral device connected to a docking station, the docking station connected to i) a plurality of peripheral devices including the first peripheral device and ii) the information handling system, the firmware update package associated with a total storage size; providing a notification indicating i) the particular peripheral device associated with the firmware update package and ii) the firmware update package, wherein a storage capacity of the docking station is less than the total storage size of the firmware update package; providing a request for access to additional storage capacity, and in response: identifying a connected computing device to the docking station; determining a storage availability of the connected computing device; and storing a second portion of the firmware update package at the connected computing device.

9 Claims, 5 Drawing Sheets

(56) References Cited

U.S. PATENT DOCUMENTS

| | | | | |
|---|---|---|---|---|
| 9,177,122 | B1 * | 11/2015 | Trier | G06F 8/65 |
| 9,778,928 | B1 * | 10/2017 | Steshenko | G06Q 20/352 |
| 10,185,551 | B2 * | 1/2019 | Kulkarni | G06F 8/654 |
| 10,776,492 | B2 * | 9/2020 | Samuel | G06F 21/572 |
| 11,442,718 | B2 * | 9/2022 | Hung | G06F 11/1438 |
| 2022/0334820 | A1 * | 10/2022 | R | G06F 9/44505 |

OTHER PUBLICATIONS

Falas et al, "A Modular End-to-End Framework for Secure Firmware Updates on Embedded Systems", ACM, pp. 1-19 (Year: 2021).*

Tacchella et al, "Firmware Secure Updates Meet Formal Verification", ACM, pp. 1-26 (Year: 2026).*

Zandberg et al, "Secure Firmware Updates for Constrained IoT Devices Using Open Standards: A Reality Check", IEEE, pp. 1-4 (Year: 2019).*

Bettayeb et al, "Firmware Update Attacks and Security for IoT Devices", ACM, pp. 1-6 (Year: 2019).*

* cited by examiner

UPDATING FIRMWARE OF PERIPHERAL DEVICES WITH AN INFORMATION HANDLING SYSTEM

BACKGROUND

Field of the Disclosure

The disclosure relates generally to an information handling system, and in particular, updating firmware of peripheral devices associated with the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A docking station is a peripheral device that allows a laptop or portable computer to connect to various external peripherals and accessories. It serves as a central hub, providing additional ports and functionality beyond what the laptop itself offers. Docking stations are commonly used in office environments, where users can quickly connect their laptops to a larger monitor, keyboard, mouse, and other devices. Docking stations typically include a variety of ports, such as USB, HDMI, DisplayPort, Ethernet, audio jacks, and power connectors. These ports allow users to connect external monitors, printers, external hard drives, and other peripherals without the hassle of plugging and unplugging individual cables each time.

SUMMARY

Innovative aspects of the subject matter described in this specification may be embodied in a method of updating firmware, including identifying, by an external computing device in communication with a docking station and an information handling system, a firmware update package for a first peripheral device connected to the docking station, the docking station connected to i) a plurality of peripheral devices including the first peripheral device and ii) the information handling system, the firmware update package associated with a total storage size; providing, by the external computing device and to the docking station, a notification indicating i) the particular peripheral device associated with the firmware update package and ii) the firmware update package, wherein a storage capacity of the docking station is less than the total storage size of the firmware update package; storing, by the docking station and based on the storage capacity of the docking station, a first portion of the firmware update package at the docking station; providing, by the docking station and to the external computing device, a request for access to additional storage capacity; in response to the request: identifying, by the external computing device, a connected computing device to the docking station, the connected computing device including a second peripheral device of the plurality of peripheral devices or the information handling system; determining, by the external computing device, a storage availability of the connected computing device; and storing, at the connected computing device, a second portion of the firmware update package at the connected computing device.

Other embodiments of these aspects include corresponding systems, apparatus, and computer programs, configured to perform the actions of the methods, encoded on computer storage devices.

These and other embodiments may each optionally include one or more of the following features. For instance, establishing a connection between the information handling system and the external computing device, including identifying an available storage capacity of the information handling system; establishing a connection between the docking station and the external computing device, including identifying an available storage of each of the plurality of peripheral devices connected to the docking station; and establishing a connection between the docking station and the information handling system. Storing the second portion of the firmware update package at the connected computing device further includes providing, by the external computing device, the second portion of the firmware update package to the connected computing device. Storing, at the docking station, metadata associated with the firmware, the metadata indicating the connected computing device and the second portion of the firmware package. Updating, by the docking station, the first peripheral device with the firmware update package. Updating the first peripheral device with the firmware update package further includes: copying the first portion of the firmware update package to the first peripheral device; determining, by the docking station and based on the metadata, that the firmware update package includes one or more portions stored at differing storage locations; in response to determining that that the firmware update package includes one or more portions stored at differing storage locations, obtaining the second portion of the firmware update package from the connected computing device; copying the second portion of the firmware update package to the first peripheral device; and providing a notification to the first peripheral device to perform an update based on the first and the second portion of the firmware update package.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
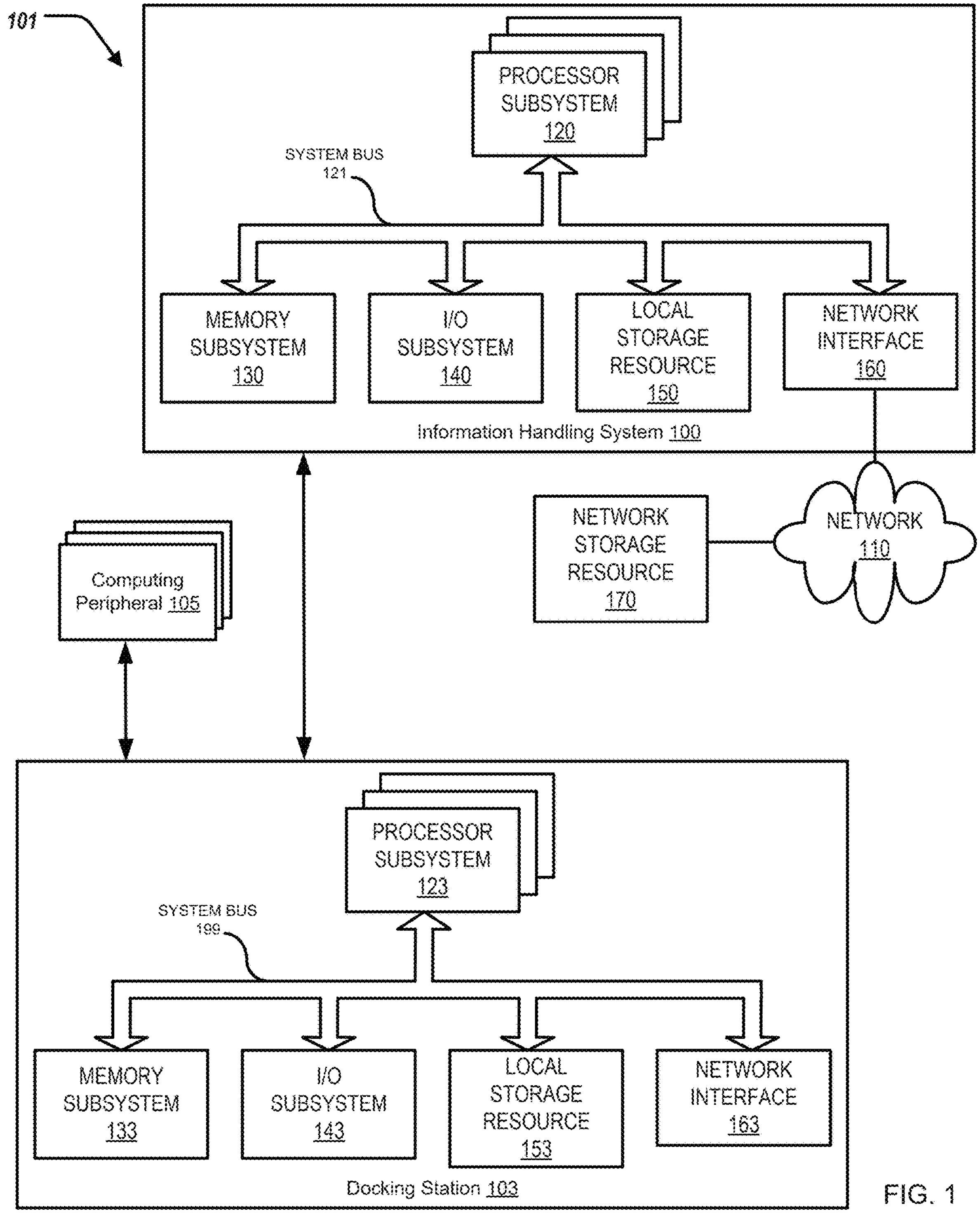
FIG. 1 is a block diagram of selected elements of an embodiment of an information handling system.

This disclosure discusses methods and systems for updating firmware of peripheral devices. In short, when the peripheral devices are coupled to a docking station, firmware updates to the peripheral devices can provide stability, security enhancements, performance improvements, compatibility, new functionality, and extended lifespan of the peripheral devices. However, the docking station may include limited memory resources that may challenge seamless firmware upgrades of the peripheral devices. To that end, the docking station can leverage the resources of the information handling system and/or the other peripheral devices to upgrade the peripheral devices and/or the docking station, described further herein.

Specifically, this disclosure discusses a system and a method for updating firmware, including identifying, by an external computing device in communication with a docking station and an information handling system, a firmware update package for a first peripheral device connected to the docking station, the docking station connected to i) a plurality of peripheral devices including the first peripheral device and ii) the information handling system, the firmware update package associated with a total storage size; providing, by the external computing device and to the docking station, a notification indicating i) the particular peripheral device associated with the firmware update package and ii) the firmware update package, wherein a storage capacity of the docking station is less than the total storage size of the firmware update package; storing, by the docking station and based on the storage capacity of the docking station, a first portion of the firmware update package at the docking station; providing, by the docking station and to the external computing device, a request for access to additional storage capacity; in response to the request: identifying, by the external computing device, a connected computing device to the docking station, the connected computing device including a second peripheral device of the plurality of peripheral devices or the information handling system; determining, by the external computing device, a storage availability of the connected computing device; and storing, at the connected computing device, a second portion of the firmware update package at the connected computing device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of a computing environment 101 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The environment 101 can further include a docking station 103 (or a "smart" docking station). The docking station 103 can be coupled to the information handling system 101—that is, the information handling system 101 can be physically coupled to the docking station 103 as well as communicatively coupled to the docking station 103. One or more peripherals 105 (or peripheral devices 105) can be coupled (physically and communicatively) to the docking station 103. In short, the docking station 103 facilitates connection between the information handling system 101 and the peripherals 105 acting as a central hub to stream connectively and productivity of the information handling system 101. The peripherals 105 can include external displays, keyboards, mice, wired Ethernet, backup hard drives, printers, and the like.

The docking station 103 can include a processor subsystem 123, a memory subsystem 133, an I/O subsystem 143, a local storage resource 153, a network interface 163, and a system bus 199. The processor subsystem 123, the memory subsystem 133, the I/O subsystem 143, the local storage resource 153, the network interface 163, and the system bus 199 can be similar to (similar functionality) the processor subsystem 120, the memory subsystem 130, the I/O subsystem 140, the local storage resource 150, the network interface 160, and the system bus 121 of the information handling system 100.

Figure 2:
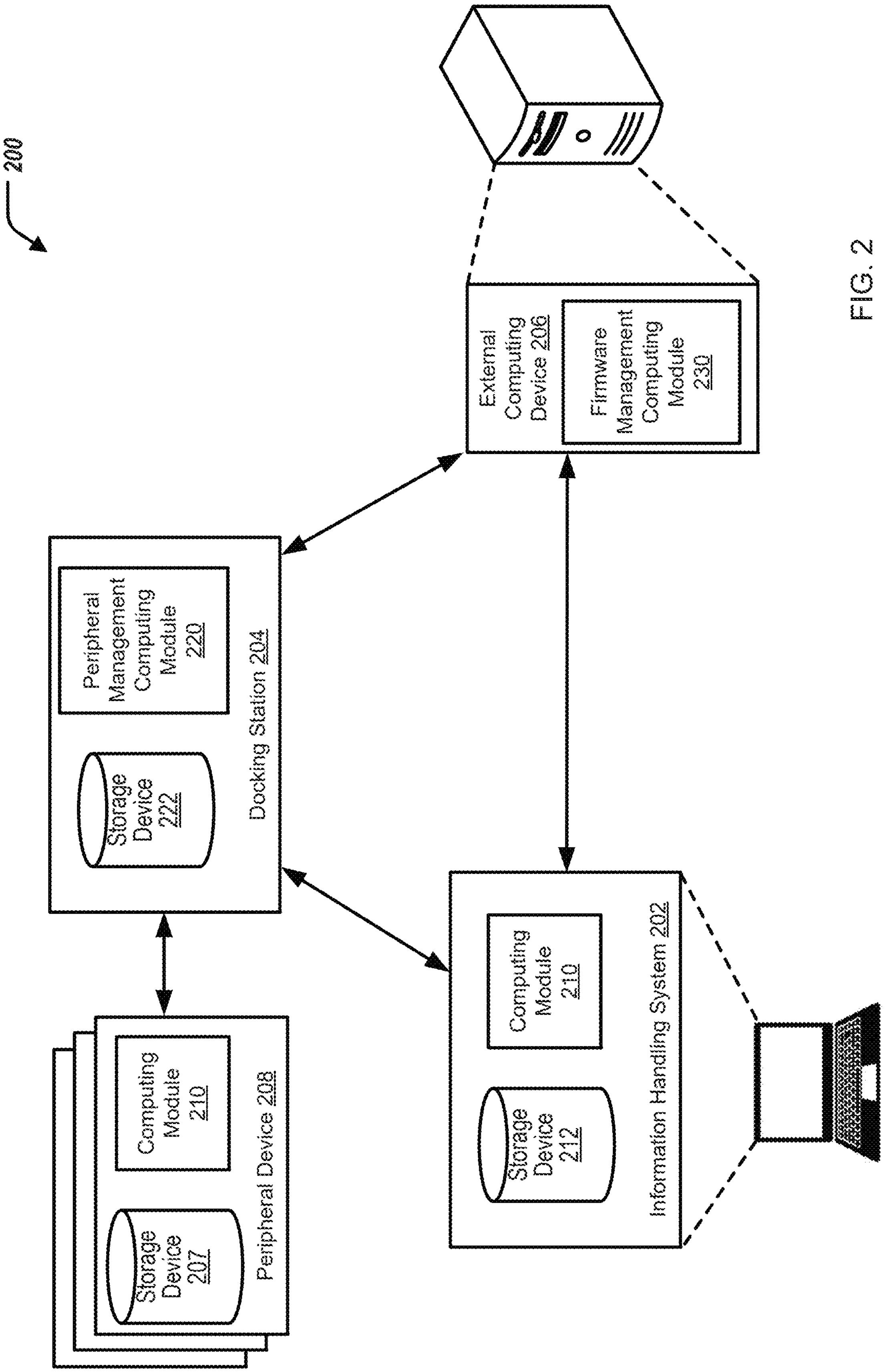
FIG. 2 illustrates a block diagram of a computing environment for updating firmware of peripheral devices.

Turning to FIG. 2, FIG. 2 illustrates an environment 200 including an information handling system 202, a docking station 204, an external computing device 206, and peripheral devices 208 (or computing peripherals 208, or devices 208).

The information handling system 202 can include a computing module 210 and a storage device 212. In some examples, the information handling system 202 is similar to, or includes, the information handling system 100 of FIG. 1.

The docking station 204 can include a peripheral management computing module 220 and a storage device 222. In some examples, the docking station 204 is similar to, or includes, the docking station 103 of FIG. 1.

The external computing device 206 can include a firmware management computing module 230. The external computing device 206 can be a cloud-based computing device (or cloud-based server). The external computing device 206 can include one or more computing devices/computing servers.

The peripheral device 208 (one or more peripheral devices 208) can include a computing module 240 and a storage device 207. In some examples, the peripheral device 208 is similar to, or includes, the peripheral device 105 (or computing peripheral 105) of FIG. 1.

The information handling system 202 can be in communication with the docking station 204. That is, the information handling system 202 can be physically and communicably coupled with the docking station 204. In some examples, the information handling system 202 is in communication with the docking station 204 over a stateless out-of-band (OOB) channel. The information handling system 202 can further be in communication with the external computing device 206, e.g., over a network (the Internet).

The docking station 204 can be in communication with the information handling system 202. That is, the docking station 204 can be physically and communicably coupled with the information handling system 202. The docking station 204 can further be in communication with the external computing device 206, e.g., over a network (the Internet).

The external computing device 206 can be in communication with the information handling system 202 and the docking station 204, e.g., over a network (the Internet).

The peripheral devices 208 can be coupled to the docking station 204. In some examples, additional peripheral devices can be coupled to the information handling system 202.

In short, with the peripheral devices 208 coupled to the docking station 204, firmware updates to the peripheral devices 208 can provide stability, security enhancements, performance improvements, compatibility, new functionality, and extended lifespan of the peripheral devices 208. However, the docking station 204 may include limited memory resources that may challenge seamless firmware upgrades of the peripheral devices 208. To that end, the docking station 204 can leverage the resources of the information handling system 202 and/or the other peripheral device 208 to upgrade the peripheral devices 208 and/or the docking station 204, described further herein.

Figure 3:
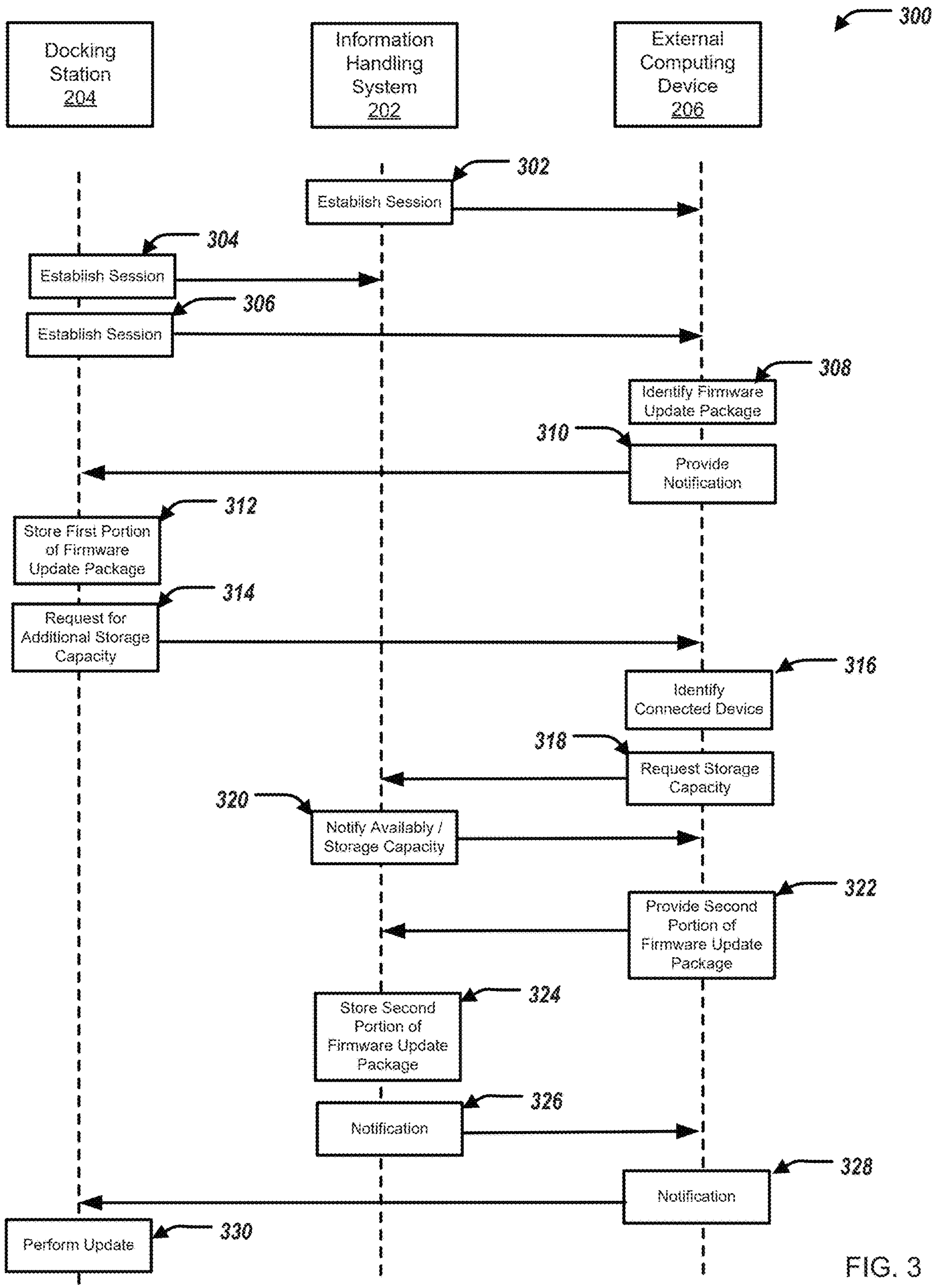
FIG. 3 illustrates a swim-lane diagram for updating firmware of peripheral devices.

FIG. 3 illustrates a flowchart depicting selected elements of an embodiment of a method 300 for updating firmware of peripheral devices. The method 300 may be performed by the information handling system 100, the information handling system 202, the docking station 103, the docking station 204, and/or the external computing device 206 and with reference to FIGS. 1-2. It is noted that certain operations described in method 300 may be optional or may be rearranged in different embodiments.

The information handling system 202 establishes a connection with the external computing device 206, at 302. Specifically, the computing module 210 of the information handling system 202 establishes the connection (communication connection) with the external computing device 206, including providing data indicating the available storage capacity of the storage device 212 of the information handling system 202 to the external computing device 206.

The information handling system 202 establishes a connection with the docking station 204, at 304. Specifically, the computing module 210 of the information handling system 202 establishes a connection (communication connection) with the docking station 204.

The docking station 204 establishes a connection with the external computing device 206, at 306. Specifically, the peripheral management computing module 220 establishes a connection with the external computing device 206, including providing data indicating the available storage capacity of the storage device 222 of the docking station 204 and the available storage capacity of the storage device 207 of each of the peripheral devices 208.

The external computing device 206, and in particular, the firmware management computing module 230, identifies a firmware update package for a particular peripheral device 208 connected to the docking station 204, at 308. The firmware update package can be associated with a total storage size (or storage capacity). For example, the firmware update package can be associated with a total storage size of 100 megabyte (MB).

The external computing device 206, and in particular, the firmware management computing module 230, provides a notification to the docking station 204, at 310. Specifically, the external computing device 206 provides the notification to the docking station 204 that indicates i) the particular peripheral device 208 (of the plurality of peripheral devices 208) that is associated with the firmware update package, and ii) the firmware update package. To that end, a storage capacity of the storage device 222 of the docking station 204 can be less than the total storage size (or storage capacity) of the firmware update package. For example, the storage capacity of the storage device 222 of the docking station 204 can be 60 MB which is less than the total storage size of the firmware update package of 100 MB. In some examples, the storage capacity of the storage device 222 can include the available storage capacity of the storage device 222—e.g., not including storage capacity of the storage device 222 that is previously allocated, and/or required for operations of the docking station 204 such as an operating system (OS).

The docking station 204, and in particular, the peripheral management computing module 220, can store a first portion of the firmware update package at the storage device 222 of the docking station 204, at 312. Specifically, the docking station 204 can store the first portion of the firmware update package at the storage device 222 based on the storage capacity of the storage device 222. That is, when the storage capacity of the docking station 204 is less than the total storage size of the firmware update package, the size of the first portion of the firmware update package is the same (or substantially the same) as the storage capacity (or available storage capacity) of the storage device 222 of the docking station 204. For example, when the total storage size of the firmware update package of 100 MB and the storage capacity (available storage capacity) of the storage device 222 is 60 MB, the first portion of the firmware update package is 60 MB. Thus, the docking station 204 stores 60 MB (the first portion) of the firmware update package at the storage device 222.

The docking station 204, and in particular, the peripheral management computing module 220, can provide to the external computing device 206, a request for access to additional storage capacity, at 314. For example, when the storage size of the firmware update package is 100 MB and the storage capacity of the storage device 222 is 60 MB, the docking station 204 can provide, to the external computing device 206, a request for access to an additional storage capacity of 40 MB.

In response to the request, the external computing device 206, and in particular, the firmware management computing moule 230, identifies a connected computing device to the docking station 204, at 316. The connected computing device can include a second peripheral device 208 (of the plurality of peripheral devices 208) or the information handling system 202. In some examples, the external computing device 230 identifies the connected computing devices to the docking station 204 based on the previously established connections between the docking station 204 and the information handling system 202 with the external computing device 206. In the illustrated example, the external computing device 206 identifies the information handling system 202 in response to the request.

Further in response to the request, the external computing device 206, and in particular, the firmware management computing moule 230, requests an available storage capacity of the connected computing device, at 318. To that end, the external computing device 206 can identify the storage capacity of the storage device 207 of each of the peripheral devices 208 and the storage capacity of the storage device 212 of the information handling system 202. In the illustrated example, the external computing device 206 requests for the available storage capacity of the storage device 212 of the information handling system 202.

The information handling system 202, and in particular, the computing module 210, provides a notification to the external computing device 206 indicating the available storage capacity of the storage device 212 and the availability of such, at 320. For example, the information handling system can indicate that the storage device 212 is available and has an available storage capacity of 800 MB.

The external computing device 206, and in particular, the firmware management computing module 230, can provide a second portion of the firmware update package to the information handling system 202, at 322. Specifically, the second portion of the firmware update package has a storage capacity associated with a balance of the firmware update package after storing the first portion of the firmware update package. In other words, the second portion of the firmware update package is the remaining portion of the firmware update package that was not included by the first portion of the firmware update package. The summation of the first portion and the second portion of the firmware update package is a totality of the firmware update package. Thus, when the available storage capacity of the storage device 212 of the information handling system 202 is greater than the storage size of the second portion of the firmware update package (remaining balance of storage capacity of the firmware update package), the external computing device 206 provides the second portion of the firmware update package to the information handling system 202.

In some examples, the external computing device 206 can provide the second portion of the firmware update package to the information handling system 202 and a third portion of the firmware update package to the second peripheral device 208. Specifically, a combination of the second portion and the third portion of the firmware update package has a storage capacity associated with a balance of the firmware update package after storing the first portion of the firmware update package. In other words, the summation of the second portion of the firmware update package and the third portion of the firmware update package is the remaining portion of the firmware update package that was not included by the first portion of the firmware update package. The summation of the first portion, the second portion, and the third portion of the firmware update package is a totality of the firmware update package. Thus, when the available storage capacity of the storage device 212 of the information handling system 202 is less than the storage size of the remaining portion of the firmware update package, the external computing device 206 splits the remaining portion of the firmware update package for storage at multiple storage devices. Specifically, the external computing device 206 provides the second portion of the firmware update package to the information handling system 202 and the third portion of the firmware update package to the second peripheral device 208 (e.g., through the information handling system 202 and/or the docking station 204). The storage size of the second portion of the firmware update package and the storage size of the third portion of the firmware update package can be based on the (available) storage capacities of the storage device 212 of the information handling system 202 and the storage device 207 of the second peripheral device 208. For example, when the information handling system 202 indicates the storage device 212 has an available capacity of 10 MB and the second peripheral device 208 indicates the storage device 207 has an available capacity of 50 MB, and the remaining storage size of the firmware update package is 40 MB, the external computing device 206 splits the remaining portion of the firmware update package into the second portion of 10 MB (based on the storage capacity of the storage device 222) and the third portion of 30 MB (based on the storage capacity of the storage device 207).

The information handling system 202, and in particular, the computing module 210, stores the second portion of the firmware update package at the storage device 212 of the information handling system 202, at 324. For example, when the available storage capacity of the storage device 212 of the information handling system 202 is greater than the storage size of the second portion of the firmware update package (remaining balance of storage capacity of the firmware update package), the information handling system 202 stores the second portion of the firmware update package at the storage device 212. For example, when the storage capacity of the storage device 212 is 800 MB, the information handling system 202 can store the remaining 40 MB of the second portion of the firmware update package at the storage device 212.

In some examples, when the available storage capacity of the storage device 212 of the information handling system 202 is less than the storage size of the remaining portion of the firmware update package, the information handling system 202 stores the second portion of the firmware update package at the storage device 212, and the second peripheral device stores the third portion of the firmware update package at the storage device 207. For example, when the storage capacity of the storage device 212 is 10 MB, the information handling system 202 can store the 10 MB of the second portion of the firmware update package at the storage device 212; and the second peripheral device 208 can store the 30 MB of the third portion of the firmware update package at the storage device 207.

The information handling system 202, and in particular, the computing module 210, provides a notification to the external computing device 206 indicating that the second portion of the firmware update package is stored at the storage device 212 of the information handling system 202, at 326. For example, the information handling system 202 can provide a notification to the external computing device 206 indicating that the 40 MB of the second portion of the firmware update package is stored at the storage device 212.

In some examples, when the available storage capacity of the storage device 212 of the information handling system 202 is less than the storage size of the remaining portion of the firmware update package, the information handling system 202 can provide a notification to the external computing device 206 indicating that the second portion of the firmware update package is stored at the storage device 212 of the information handling system 202; and the second peripheral device 208 can provide a notification (through the docking station 204 and/or the information handling system 202) to the external computing device 206 indicating that the third portion of the firmware update package is stored at the storage device 207 of the second peripheral device 208. For example, the information handling system 202 can provide a notification to the external computing device 206 indicating that the 10 MB of the second portion of the firmware update package is stored at the storage device 212; and the second peripheral device 208 can provide a notification to the external computing device 206 indicating that the 30 MB of the third portion of the firmware update package is stored at the storage device 207.

The external computing device 206, and in particular, the firmware management computing module 230, provides a notification to the docking station 208 indicating that the second portion of the firmware update package is stored at the storage device 212 of the information handling system 202, at 328. Specifically, the external computing device 206 can provide metadata to the docking station 208 indicating i) the second portion of the firmware update package and ii) the storage location of the second portion of the firmware update package (the storage device 212 of the information handling system 202). For example, the external computing device 206 can provide metadata to the docking station 208 indicating i) the second portion of the firmware update package has a storage size of 40 MB and ii) the second portion of the firmware update package is stored at the storage device 212 of the information handling system 202.

The docking station 204 can store the metadata i) indicating the second portion of the firmware update package and ii) the storage location of the second portion of the firmware update package at the storage device 222.

In some examples, the external computing device 206 provides the notification to the docking station 208 indicating that the second portion of the firmware update package is stored at the storage device 212 of the information handling system 202 and the third portion of the firmware update package is stored at the storage device 207 of the second peripheral device 208. Specifically, the external computing device 206 can provide metadata to the docking station 208 indicating i) the second portion of the firmware update package, ii) the storage location of the second portion of the firmware update package, iii) the third portion of the firmware update package, and iv) the storage location of the third portion of the firmware update package. For example, the external computing device 206 can provide metadata to the docking station 204 indicating i) the second portion of the firmware update package has a storage size of 10 MB, ii) the second portion of the firmware update package is stored at the storage device 212 of the information handling system 202, iii) the third portion of the firmware update package has a storage size of 30 MB, and iv) the third portion of the firmware update package is stored at the storage device 207 of the second peripheral device 208.

The docking station 204 can store the metadata i) indicating the second portion of the firmware update package, ii) the storage location of the second portion of the firmware update package at the storage device 222, iii) the third portion of the firmware update package, and iv) the storage location of the third portion of the firmware update package at the storage device 207.

The docking station 204 updates the particular peripheral device 208 with the firmware update package, at 330. That is, the docking station 204 obtains the first portion of the firmware update package from the storage device 222 and the second portion of the firmware update package from the storage device 212 and updates the particular peripheral device 208 accordingly. In some examples, the docking station 204 obtains the first portion of the firmware update package from the storage device 222, the second portion of the firmware update package from the storage device 212, and the third portion of the firmware update package from the storage device 207 and updates the particular peripheral device 208 accordingly.

Figure 4:
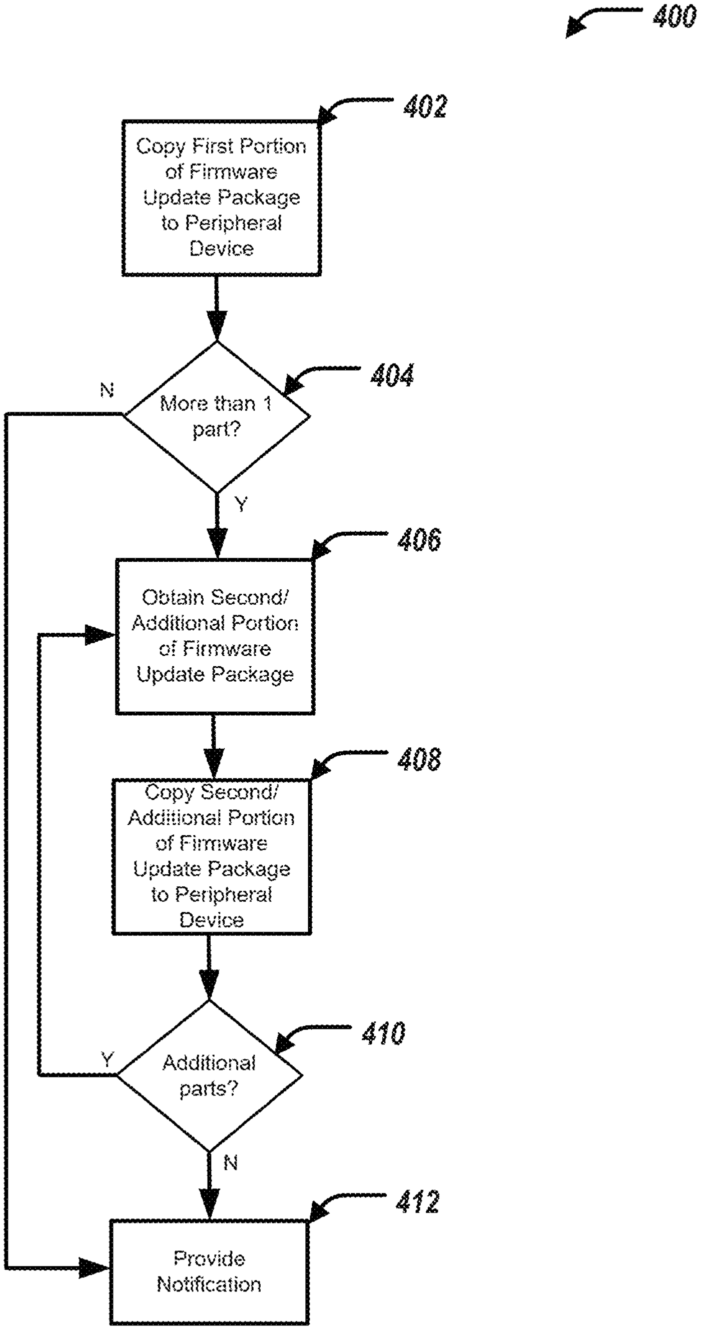
FIGS. 4, 5 illustrate respective methods for updating firmware of peripheral devices.

FIG. 4 illustrates a flowchart depicting selected elements of an embodiment of a method 400 for updating firmware of peripheral devices. The method 400 may be performed by the information handling system 100, the docking station 103, the information handling system 202, the docking station 204, and/or the external computing device 206, and with reference to FIGS. 1-2. It is noted that certain operations described in method 400 may be optional or may be rearranged in different embodiments.

The docking station 204 copies the first portion of the firmware update package to the particular peripheral device 208, at 402. For example, the docking station 204 copies the first portion of the firmware update package from the storage device 222 of the docking station 204 to the particular peripheral device 208. The docking station 204 determines whether the firmware update package includes more than one portion, at 404. For example, the docking station 204 accesses the metadata stored at the storage device 222 to determine whether the firmware update package includes more than one portion. If the docking station 204 determines that the firmware update package includes more than one portion, the docking station 204 obtains the second portion of the firmware update package from the connected computing device, at 406. For example, the docking station 204 obtains the second portion of the firmware update package from the storage device 212 of the information handling system 202. The docking station 204 copies the second portion of the firmware update package to the first peripheral device 208, at 408. The docking station 204 determines whether the firmware update package includes additional portions, at 410. For example, the docking station 204 accesses the metadata stored at the storage device 222 to determine whether the firmware update package includes additional portions. If the docking station 204 determines there are no additional portions of the firmware update package, the docking station 204 provides a notification to the particular peripheral device 208 to perform an update based on the first and the second portions of the firmware update package, at 412.

If the docking station 204 determines that the firmware update package does not include more than one portion (at 404), the docking station 204 provides a notification to the particular peripheral device 208 to perform an update based on the first portion of the firmware update package, at 412.

If the docking station determines that the firmware update package includes additional portions (at 410), the method returns to step 406. The docking station 204 obtains the third portion of the firmware update package from the connected computing device, at 406. For example, the docking station 204 obtains the third portion of the firmware update package from the storage device 207 of the second peripheral device 208. The docking station 204 copies the third portion of the firmware update package to the first peripheral device 208, at 408. The docking station determines whether the firmware update package includes additional portions, at 410. For example, the docking station 204 accesses the metadata stored at the storage device 222 to determine whether the firmware update package includes additional portions. If the docking station 204 determines there are no additional portions of the firmware update package, the docking station 204 provides a notification to the particular peripheral device 208 to perform an update based on the first, the second, and the third portions of the firmware update package, at 412.

Figure 5:
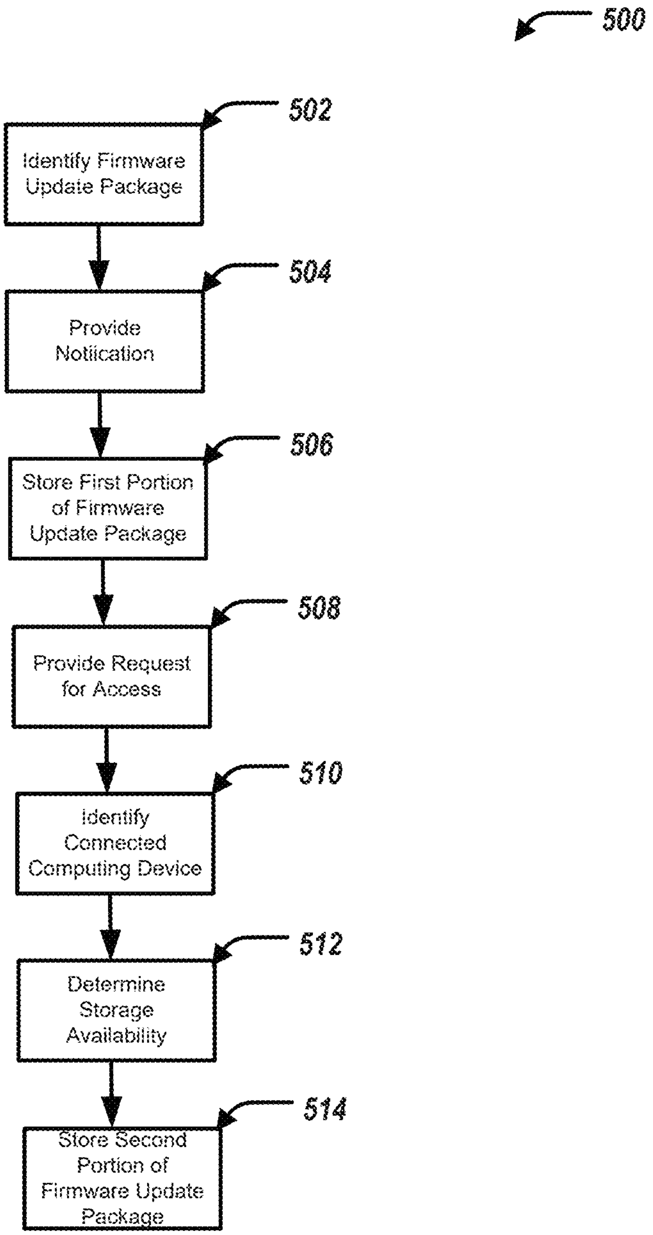

FIG. 5 illustrates a flowchart depicting selected elements of an embodiment of a method 500 for updating firmware of peripheral devices. The method 500 may be performed by the information handling system 100, the docking station 103, the information handling system 202, the docking station 204, and/or the external computing device 206, and with reference to FIGS. 1-2. It is noted that certain operations described in method 500 may be optional or may be rearranged in different embodiments.

The external computing device 206, and in particular, the firmware management computing module 230, identifies a firmware update package for a particular peripheral device 208 connected to the docking station 204, at 502. The external computing device 206, and in particular, the firmware management computing module 230, provides a notification to the docking station 204, at 504. Specifically, the external computing device 206 provides the notification to the docking station 204 that indicates i) the particular peripheral device 208 (of the plurality of peripheral devices 208) that is associated with the firmware update package, and ii) the firmware update package. The docking station 204, and in particular, the peripheral management computing module 220, can store a first portion of the firmware update package at the storage device 222 of the docking station 204, at 506. Specifically, the docking station 204 can store the first portion of the firmware update package at the storage device 222 based on the storage capacity of the storage device 222. The docking station 204, and in particular, the peripheral management computing module 220, can provide to the external computing device 206, a request for access to additional storage capacity, at 508. In response to the request, the external computing device 206, and in particular, the firmware management computing moule 230, identifies a connected computing device to the docking station 204, at 510. The connected computing device can include a second peripheral device 208 (of the plurality of peripheral devices 208) or the information handling system 202. Further in response to the request, the external computing device 206, and in particular, the firmware management computing moule 230, determines an available storage capacity of the connected computing device, at 512. The information handling system 202, and in particular, the computing module 210, stores, the second portion of the firmware update package at the storage device 212 of the information handling system 202, at 514.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of updating firmware, the method including:

identifying, by an external computing device in communication with a docking station and an information handling system, a firmware update package for a first peripheral device connected to the docking station, the docking station connected to i) a plurality of peripheral devices including the first peripheral device and ii) the information handling system, the firmware update package associated with a total storage size;

providing, by the external computing device and to the docking station, a notification indicating i) the particular peripheral device associated with the firmware update package and ii) the firmware update package, wherein a storage capacity of the docking station is less than the total storage size of the firmware update package;

storing, by the docking station and based on the storage capacity of the docking station, a first portion of the firmware update package at the docking station;

providing, by the docking station and to the external computing device, a request for access to additional storage capacity;

in response to the request:

identifying, by the external computing device, a connected computing device to the docking station, the connected computing device including a second peripheral device of the plurality of peripheral devices or the information handling system;

determining, by the external computing device, a storage availability of the connected computing device;

storing, at the connected computing device, a second portion of the firmware update package at the connected computing device;

storing, at the docking station, metadata indicating the connected computing device and the second portion of the firmware update package;

updating, by the docking station, the first peripheral device with the firmware update package, including:

copying the first portion of the firmware update package to the first peripheral device;

determining, by the docking station and based on the metadata, that the firmware update package includes one or more portions stored at differing storage locations;

in response to determining that the firmware update package includes one or more portions stored at differing storage locations, obtaining the second portion of the firmware update package from the connected computing device;

copying the second portion of the firmware update package to the first peripheral device; and providing a notification to the first peripheral device to perform an update based on the first and the second portion of the firmware update package.

2. The computer-implemented method of claim 1, further comprising:

establishing a connection between the information handling system and the external computing device, including identifying an available storage capacity of the information handling system;

establishing a connection between the docking station and the external computing device, including identifying an available storage of each of the plurality of peripheral devices connected to the docking station; and establishing a connection between the docking station and the information handling system.

3. The computer-implemented method of claim 1, wherein storing the second portion of the firmware update package at the connected computing device further includes:

providing, by the external computing device, the second portion of the firmware update package to the connected computing device.

4. A computing environment, including:

an information handling system comprising a processor having access to memory media storing instructions executable by the processor to perform operations;

a plurality of peripheral devices;

a docking station connected to the plurality of peripheral devices and the information handling system, the docking station comprising a processor having access to memory media storing instructions executable by the processor to perform operations;

an external computing device in communication with the docking station and the information handling system, the external computing device comprising a processor having access to memory media storing instructions executable by the processor to perform operations, comprising:

identifying a firmware update package for a first peripheral device of the plurality of peripheral devices connected to the docking station, the firmware update package associated with a total storage size;

providing, to the docking station, a notification indicating i) the first peripheral device associated with the firmware update package and ii) the firmware update package, wherein a storage capacity of the docking station is less than the total storage size of the firmware update package;

wherein the docking station is configured to perform operations:

storing, based on the storage capacity of the docking station, a first portion of the firmware update package at the docking station;

providing, to the external computing device, a request for access to additional storage capacity;

wherein the external computing device is further configured to perform operations:

in response to the request:

identifying a connected computing device to the docking station, the connected computing device including a second peripheral device of the plurality of peripheral devices or the information handling system;

determining a storage availability of the connected computing device; and storing, at the connected computing device, a second portion of the firmware update package at the connected computing device;

storing, at the docking station, metadata indicating the connected computing device and the second portion of the firmware update package;

updating, by the docking station, the first peripheral device with the firmware update package, including:

copying the first portion of the firmware update package to the first peripheral device;

determining, by the docking station and based on the metadata, that the firmware update package includes one or more portions stored at differing storage locations;

in response to determining that the firmware update package includes one or more portions stored at differing storage locations, obtaining the second portion of the firmware update package from the connected computing device;

copying the second portion of the firmware update package to the first peripheral device; and providing a notification to the first peripheral device to perform an update based on the first and the second portion of the firmware update package.

5. The computing environment of claim 4, further comprising:

wherein the information handling system is configured to perform operations:

establishing a connection between the information handling system and the external computing device, including identifying an available storage capacity of the information handling system;

wherein the docking station is configured to perform operations:

establishing a connection between the docking station and the external computing device, including identifying an available storage of each of the plurality of peripheral devices connected to the docking station; and establishing a connection between the docking station and the information handling system.

6. The computing environment of claim 4, wherein storing the second portion of the firmware update package at the connected computing device further includes:

providing, by the external computing device, the second portion of the firmware update package to the connected computing device.

7. A non-transitory computer-readable medium storing software comprising instructions executable by one or more computers which, upon such execution, cause the one or more computers to perform operations comprising:

identifying, by an external computing device in communication with a docking station and an information handling system, a firmware update package for a first peripheral device connected to the docking station, the docking station connected to i) a plurality of peripheral devices including the first peripheral device and ii) the information handling system, the firmware update package associated with a total storage size;

providing, by the external computing device and to the docking station, a notification indicating i) the particular peripheral device associated with the firmware update package and ii) the firmware update package, wherein a storage capacity of the docking station is less than the total storage size of the firmware update package;

storing, by the docking station and based on the storage capacity of the docking station, a first portion of the firmware update package at the docking station;

providing, by the docking station and to the external computing device, a request for access to additional storage capacity;

in response to the request:

identifying, by the external computing device, a connected computing device to the docking station, the connected computing device including a second peripheral device of the plurality of peripheral devices or the information handling system;

determining, by the external computing device, a storage availability of the connected computing device; and storing, at the connected computing device, a second portion of the firmware update package at the connected computing device;

storing, at the docking station, metadata indicating the connected computing device and the second portion of the firmware update package;

updating, by the docking station, the first peripheral device with the firmware update package, including:

copying the first portion of the firmware update package to the first peripheral device;

determining, by the docking station and based on the metadata, that the firmware update package includes one or more portions stored at differing storage locations;

in response to determining that the firmware update package includes one or more portions stored at differing storage locations, obtaining the second portion of the firmware update package from the connected computing device;

copying the second portion of the firmware update package to the first peripheral device; and providing a notification to the first peripheral device to perform an update based on the first and the second portion of the firmware update package.

8. The non-transitory computer-readable medium of claim 7, the operations further comprising:

establishing a connection between the information handling system and the external computing device, including identifying an available storage capacity of the information handling system;

establishing a connection between the docking station and the external computing device, including identifying an available storage of each of the plurality of peripheral devices connected to the docking station; and establishing a connection between the docking station and the information handling system.

9. The non-transitory computer-readable medium of claim 7, wherein storing the second portion of the firmware update package at the connected computing device further includes:

providing, by the external computing device, the second portion of the firmware update package to the connected computing device.

* * * * *